United States Patent

Watt

Patent Number: 5,781,532
Date of Patent: Jul. 14, 1998

[54] DATA LINK INTERFACE FOR PACKET-SWITCHED NETWORK

[75] Inventor: James Watt, Kanata, Canada

[73] Assignee: Newbridge Networks Corporation, Kanata, Canada

[21] Appl. No.: 666,335

[22] PCT Filed: Dec. 22, 1994

[86] PCT No.: PCT/CA94/00724

§ 371 Date: Aug. 2, 1996

§ 102(e) Date: Aug. 2, 1996

[87] PCT Pub. No.: WO95/17788

PCT Pub. Date: Jun. 29, 1995

[30] Foreign Application Priority Data

Dec. 23, 1993 [GB] United Kingdom ............... 9326276

[51] Int. Cl.⁶ .............................................. H04L 12/56
[52] U.S. Cl. .............................. 370/236; 370/394; 370/412
[58] Field of Search ............................. 370/230–232, 370/235, 236, 229, 352, 252, 253, 429, 417, 418, 412–416, 401, 394, 468, 395; 395/200.02, 200.13

[56] References Cited

U.S. PATENT DOCUMENTS

| | | | |
|---|---|---|---|
| 5,014,265 | 5/1991 | Hahne et al. | 370/395 |
| 5,231,633 | 7/1993 | Hluchyj et al. | 370/429 |
| 5,335,224 | 8/1994 | Cole et al. | 370/235 |
| 5,506,839 | 4/1996 | Hatta | 370/236 |
| 5,600,798 | 2/1997 | Cherukuki et al. | 395/200.13 |

Primary Examiner—Chau Nguyen
Attorney, Agent, or Firm—Marks & Clerk

[57] ABSTRACT

A router for sending and receiving data over a virtual connection in a packet-switched network, such as a frame relay network, includes a device for detecting congestion in received data packets, and a device for adjusting the transmission rate of packets into the network when congestion is detected.

12 Claims, 2 Drawing Sheets

DATA LINK INTERFACE FOR PACKET-SWITCHED NETWORK

BACKGROUND OF THE INVENTION

This invention relates generally to packet-switched networks, and more particularly to a data link interface, such as may be incorporated in a router for connection to a frame relay network.

Frame relay is a packet switching technology designed to require the minimum processing. Frame relay networks provide dynamic bandwidth allocation by switching framed data between connection segments. The networks are based on virtual connections, which can either be switched or permanent. The present invention is concerned with permanent virtual connections (PVCs).

Permanent virtual connections (PVCs) are end-to-end logical connections across a frame relay network composed of a sequence of PVC segments between pairs of frame relay DCEs (data connection ends) or frame relay DCE and a frame relay DTE (data terminal end).

Each end of PVC segment is called a data link connection (DLC). A DLC is identified on a frame relay port with a locally unique number called the data link connection identifier (DLCI).

On frame relay networks, there is potential for downstream network congestion. Frame relay switches use a backward explicit congestion notification bit (BECN) bit to notify user devices of congestion. The BECN bit is included in the address header of each Q.922 frame. Conventional routers ignore the BECN bit and congested permanent virtual connections. They continue to send out data over frame relay links to the network as if the PVCs were not congested, and as a result, packets are dropped, causing expensive retransmissions and down time for applications.

N. J. Muller (INTERNATIONAL JOURNAL OF NETWORK MANAGEMENT, vol. 2., No. 2, Jun. 1992, UK pages 87–99) discloses the adjustment of transmission rate in the presence of network congestion. However, Muller does not disclose any means of making optimum use of the bandwidth available in the presence of congestion.

An object of the invention is to alleviate the aforementioned problems.

SUMMARY OF THE INVENTION

According to the present invention there is provided a data link interface for sending and receiving data over a virtual connection in a packet-switched network, comprising means for detecting congestion in the network, and means for adjusting the transmission rate in response to the detection of said congestion so as to reduce congestion in the network, characterized in that it further comprises means for sorting traffic by conversation between two endpoints, and means for re-ordering packets from different conversations on a common link in the presence of congestion while maintaining the order of transmission for each conversation in order to achieve fair allocation of bandwidth among different conversations.

Preferably the network is a frame relay network, and the means for detecting congestion in the network comprises a congestion bit detector, preferably a backward explicit congestion bit (BECN) detector. The virtual connection may be a permanent virtual connection.

Preferably, upon detection of a BECN bit, the interface, which is normally a router drops the transmission rate to a predetermined rate known as the committed information rate (CIR). Traffic is then prioritized according to type, with bandwidth guaranteed to critical applications even during periods of severe congestion.

Unlike most routers, which treat all data equally, a router operating in accordance with the invention sorts traffic by conversation between user data devices, and then allocates bandwidth fairly between active conversations. Heavy usage applications, such as bulk file transfers, are forced to share link capacity fairly with lighter usage applications.

The router can therefore offer reliable frame relay data transmission and protection for high priority calls. Network behavior is stabilized during congestion, resulting in increased speed and reduced overheads.

BRIEF DESCRIPTION OF THE DRAWINGS

The invention will now be described in more detail, by way of example only, with reference to the accompanying drawings, in which.

DESCRIPTION OF THE PREFERRED EMBODIMENT

Figure 1:
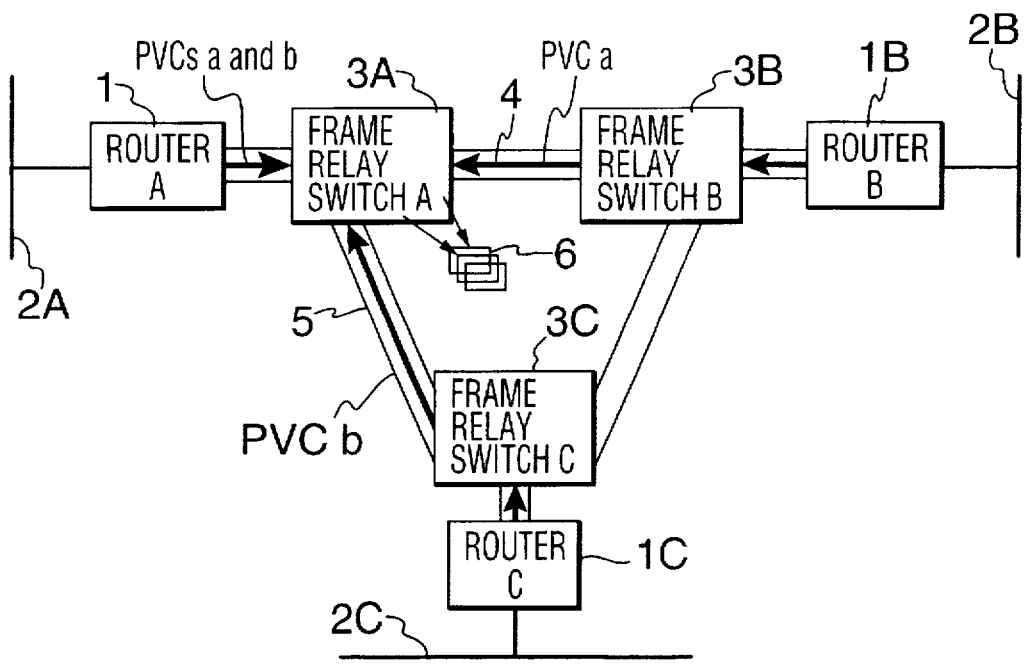
FIG.1 is block diagram of a prior art frame relay network providing permanent virtual connections between routers.

Referring now to FIG. 1, routers 1A, 1B, and 1C are connected to respective local networks, for example Local Area Networks (LANs) networks, 2A, 2B, and 2C. The routers are connected to frame relay switches 3A, 3B, 3C forming part of a frame relay network and providing permanent virtual connections (PVCs a and b) 4 and 5.

In operation, when the network becomes congested, e.g. because of traffic transmitted by routers B and C in excess of switch A's capacity, the routers continue to send data at their maximum rate to the frame relay switches. As a result, the buffers of the frame relay switches 3 overflow, packets of data 6 are dropped, and applications fail.

Figure 2:
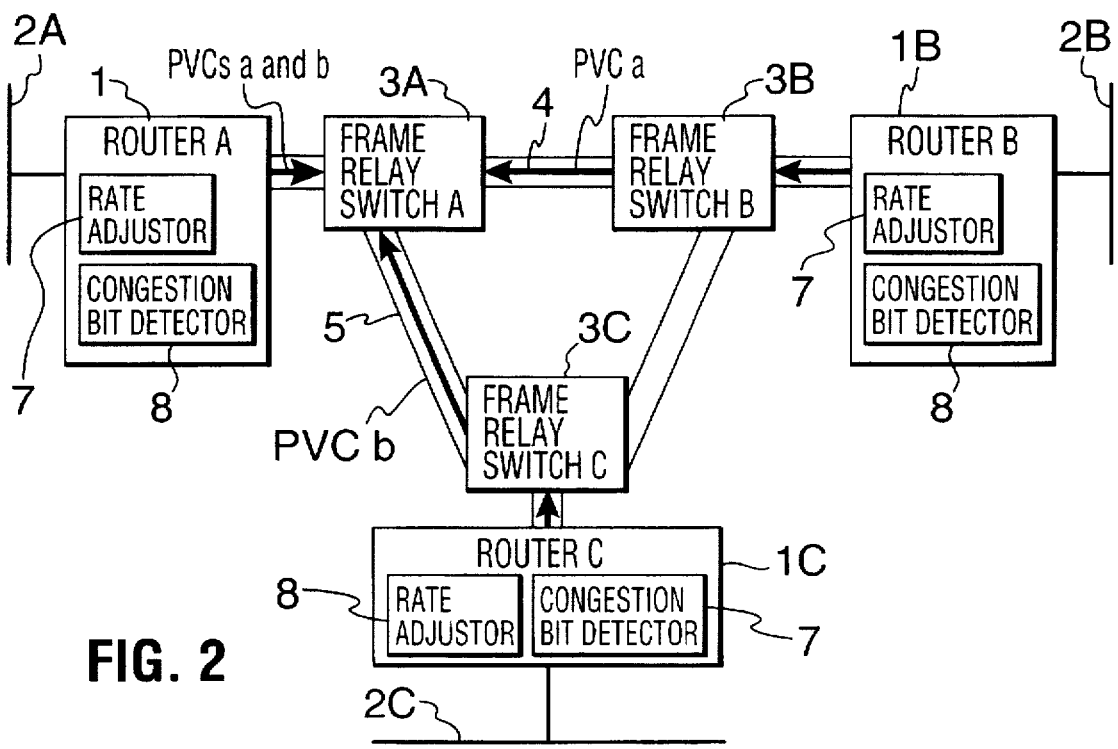
FIG. 2 is a block diagram of a frame relay network operating in accordance with the invention.

In the arrangement shown in FIG. 2, the routers include a congestion bit detector 7 and a rate adjuster 8. Upon detection of a backward explicit congestion notification (BECN) by the detector 7 in an incoming packet, the rate adjuster 8 adjusts the outgoing transmission rate downward to a lower rate, known as the committed information rate (CIR), so as to reduce the likelihood of packets being dropped.

The routers shown in FIG. 2 implement the frame relay data link protocol as described in American National Standards Institute DSS1-Core Aspects of Frame Protocol For Use With Frame Relaying Bearer Service, T1.618 and CCITT, ISDN Data Link Lab Specification For Frame Mode Bearer Services, Volume 6 recommendation Q.922.

The routers support un-numbered information frames (UI) with 10, 16, or 23 bit DLCIs (data link connection identifiers). The size of the address field is configurable on a per physical port basis.

Frames with a control field set to other than $03 (UI), too short or with a DLCI of a length different from that programmed for the port are silently discarded, counted, and the first 64 bytes of the frame recorded.

The routers 1A, 1B, 1C transmit all frames with BECN (backward explicit congestion notification bit)=0, FECN (forward explicit congestion notification bit) =0, C/R=0, D/C=0 and the DE (Discard Eligibility) bit set on "low priority" frames only. The priority is set by the clients of the data link interface. Frames larger than N201 are not transmitted.

For received frames, the routers 1A, 1B, 1C ignore the FECN and C/R bits and act on the BECN bit described below.

In addition, the routers ensure that the frame length is greater than five but less than N201 bytes. N201 is not configurable and has a value of 4500.

The use of DLCIs (Data Link Connection Identifiers) on a frame-rely link is as summarized in Table 1 below. Only the DLCIs marked user-configurable are available to transport traffic on behalf of the clients of the data link.

TABLE 1

| DCLI Range | | | |
|---|---|---|---|
| 10 bit | 16 bit | 23 bit | Function |
| 0 | 0 | 0 | T1.617 Annex D |
| 1–15 | 1–1023 | 1–131 071 | Reserved (T1.618) |
| 16–1007 | 1024–63 487 | 131 072–8 126 463 | User Configurable |
| 1008–1022 | 64 412–65 534 | 8 257 536–8 388 606 | Reserved (T1.618) |
| 1023 | 65 535 | 8 388 607 | Link Management |

Both the Local Management Interface (LMI) described in 001-208966 [Digital Equipment Corporation, Northern Telecom Inc. and Stratacom Inc., Cisco Inc., Frame Relay Specification With Extensions, Document Number 001-208966 Revision 1.0, September 1990] and T1.617 Annex D [American National Standards Institute, Integrated Services Digital Network (ISDN)—Digital Subscriber Signaling System No. 1 (DSSI)—Signal Specification For Frame Relay Bearer Service, T1.617, March 1991] can be used to provide PVC status and configuration information to the router from the frame-relay network.

The routers support T1.617. The Annex D protocol runs over DLCI 0 on a link.

The routers support all mandatory portions of the LMI (local management interface), all extensions specified in Section 6 (common extensions) and implement receive processing of asynchronous updates including the New, Active and Deleted bits (but does not originate asynchronous updates.

The LMI (local management interface) protocol runs over DLCI 1023 on a link—this is not configurable. The LMI can only be used on frame-relay links configured for 10-bit DLCIs.

If the routers are configured to use the LMI and the network is configured to use Annex D, or vice-versa, each end will receive the management traffic on an unconfigured DLCI and this is reported as part of the per-frame-relay link statistics.

All bridged and routed traffic carried over a frame relay link is encapsulated as described in RFC 1294 [T. Bradley, C. Brown, A. Malis, Multi-Protocol Interconnect Over Frame Relay, Request For Comments (RFC) 1294, DDN Network Information Center, SRI International, Menlo Park, Calif., USA, January 1992].

Figure 3:
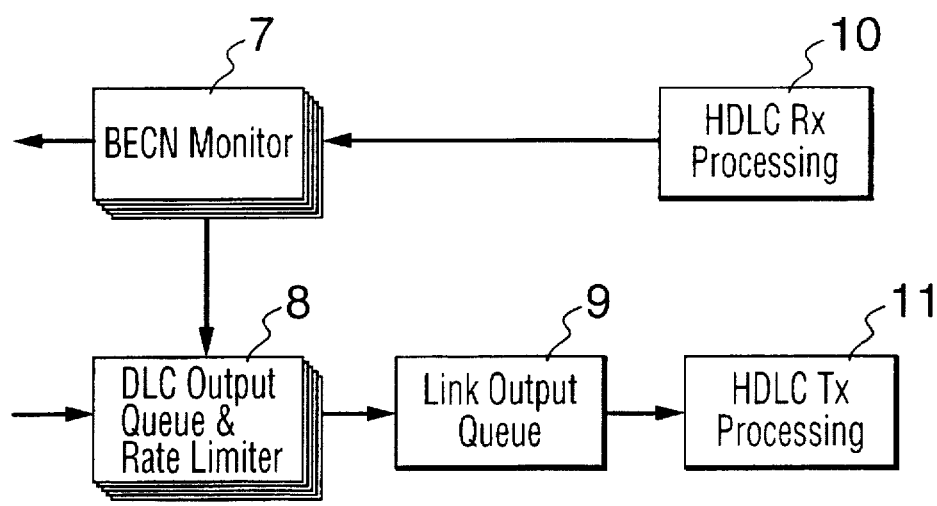
FIG. 3 is a block diagram showing the flow of data through a frame relay interface in accordance with the invention.

Referring now to FIG. 3, which shows the BECN monitor 7 and DLC output queue and rate limiter 8, the BECN monitor is connected to the HDLC receive processing unit 10 and the DLC rate limiter 8 is connected to link output queue unit 9 and HDLC transmit processing unit 11.

The DLC output queue is a "Fair Queue"(see [Alan Demers, Srinivasan Keshav, Scott Shenker, "Analysis and Simulation of a Fair Queuing Algorithm", SIGCOMM '89, 1989]) with the conversation identifier a function of the upper layer source and destination addresses. This queue is bypassed if the traffic meets the bandwidth admission criteria specified below.

The link output queue is a "Fair Queue" with the conversation identifier a 1:1 mapping of the DLCI. The link output queue is bypassed when the hardware transmit queue is not full.

The router applies bandwidth admission rules to the encapsulated frame prior to queuing the frame for transmission to enforce a maximum offered load towards the network.

The load offered by the router to the network is determined by the Committed Information Rate (CIR), Excess Burst (Be) and Committed Burst (Bc) defined by the user on a per-DLC basis—to implement bandwidth usage policies different from those described in T1.617, the user sets the CIR, Be and BC values to reflect those policies. In steady state, the router delivers a load toward that network that is within ±500 kbits/s of the target rate.

If the load offered on a DLC exceeds the maximum which will be offered to the network (see below) the bandwidth admission mechanism will queue frames in a "holding queue" to "smooth" the load offered to the network. The holding queue has a maximum length; when the length is exceeded frames are dropped.

The rate at which the router will transmit frames depends on the congestion status of the attached frame-relay network. The congestion status of the connection is approximated by examining the value of a cctCongested (DLCI) state variable.

If the connection is not congested, the router transmits on the DLC in question at rate which approximates EBR=(1= BE/Bc)×CIR—the excess burst rate.

If the network is believed to be congested the router transmits on the DLCI in question at a rate which approximates the CIR.

To provide a transmit rate on a per-DLC basis which closely approximates either the CIR or the excess rate, the router internally uses a sliding window with a width of Ti seconds. The value of Ti has only internal significance to the router and is chosen to provide the required accuracy in rate enforcement—Ti is currently 100 ms.

In the rules below, Nc=Ti * CIR and Ne=Ti * (1=Be/Bc) * CIR. If a literal interpretation of " . . . bits totalling less than . . . " cause the router to queue a portion of a frame, the relay will queue the whole frame and deduct the excess bits from the quota for the next interval in which a frame is transmitted on the link.

BANDWIDTH ADMISSION—NO CONNECTION CONGESTION IN NETWORK i) bits totalling less than Ne during an interval Ti are passed on without modification ii) Bits in excess of Ne are queued in a "holding queue" for transmission during a future interval

BANDWIDTH ADMISSION—CONNECTION CONGESTION IN NETWORK

I) bits totalling less than Ne during the interval Ti are passed on without modification.

ii) bits in excess of Ne are queued in a "holding queue" for transmission during a future interval.

Any frame "passed on" is passed to the link output mechanism for further processing. If the size of the output queue for the frame-relay link is less than the mild congestion threshold, the frame will be passed to the hardware for transmission on the link otherwise the frame will be enqueued in the link output queue using the express queuing discipline described below.

There are three ways for a frame relay network to inform the router of congestion in the network: setting FECN and/or BECN in frames transmitted towards the router, and sending consolidated link-layer management (CLLM) messages to the router.

The router ignores both the FECN bit in received frames and CLLM frames in their entirety. The router responds to frames received with BECN bits by temporarily reducing the load offered to the network on the indicated DLC.

When the router receives a frame with the BECN bit set in interval n×Ti, the connection is assumed to be congested in the network and the state variable cctCongested [DLCI] is set beginning in interval (n+1)×Ti. The state variable is cleared for the interval after the first one in which the router transmits at the lower rate and remains clear until a frame is received with the BECN bit set.

Frame-relay links on a router may become congested if the traffic to be transmitted on the link exceeds the access rate of the link. This congestion is likely to occur due to the large (typically an order of magnitude) difference between the data rate on the LAN side of the router and the data rate on the frame relay side.

Congestion of a frame-relay link is detected by examining the output queues of the frame relay link. There are three thresholds associated with each link:

a) Mild congestion threshold—fixed to the size of the hardware output queue (typically seven frames).

B) Severe congestion threshold—a configurable percentage of the absolute congestion threshold and c) Absolute congestion threshold—determined by the router as a function of the number of buffers available and the number and access rates of all of the frame-relay links in the router.

A frame-relay link is mildly congested if the size of the output queue for the link exceeds a small limit—the limit is defined by the hardware used to implement the link.

A frame-relay link is severely congested if the number of bytes queued for transmission on the frame-relay link exceeds the configurable severe congestion threshold.

A frame-relay link is absolutely congested if the number of bytes queued for transmission on the frame-relay link exceeds the absolute congestion threshold.

When the router drops a frame as part of its link congestion management described below, it also immediately exhausts the DLCs transmit quota for the current interval and sets the cctCongested [DLCI] state variable for the DLC on which the dropped frame was carried for the next interval. This is done in an attempt to alleviate the source of congestion in a reasonably fair manner.

When a frame-relay link is mildly congested, the router imposes an ever-so-slightly modified form of express queuing discipline on the output queue of the frame-relay link to prevent data queued for a DLC in the next interval from preceding any data queued for another DLC in the current interval. This is called "fair queuing".

Express queuing attempts to guarantee fair real-time allocation of bandwidth to multiple contending sources in the presence of congestion. It does so by:

a) identifying each frame to be queued as part of a "conversation" between two endpoints (this is exactly the DLCI in the frame) and b) imposing a Time-Division-like allocation of a link's bandwidth among all of the active "conversations".

In this context, "time-division" means that the express queuing mechanism treats each "conversation" as if it had a separate link for which frames could be queued. From the size of each frame, the router computes "when" a frame would be sent on its virtual link.

Figure 4:
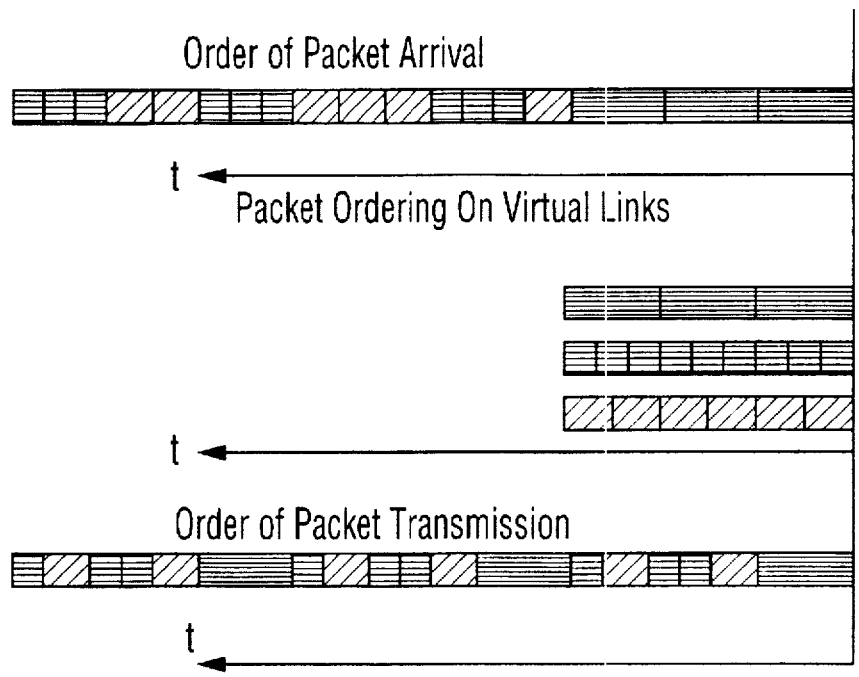
FIG. 4 is a chart illustrating a simple example of express queuing.

When a frame is to be transmitted, the router chooses the frame with the earliest start of transmission time. This does not cause re-ordering within a conversation, but may cause re-ordering across the whole link in order to attempt to provide a fair allocation of bandwidth to all conversations. FIG. 4 shows a simple example of how express queuing works.

When a frame-relay link is severely congested, the router continues to impose the express queuing discipline on the link's output queue. In addition, it notifies the outside world and starts to drop frames as described below.

The router raises an alarm when the number of bytes queued to a frame-relay link exceed the severe congestion threshold and clears the alarm when the number of bytes queued has remained below the severe congestion threshold for 5 second.

If the router attempts to add a frame to the link output queue, and the addition of the frame would cause the link output queue to exceed the severe congestion threshold and the frame would be added at the tail of the queue, the frame is dropped.

When a frame-relay link is absolutely congested, the router continues to impose the express queuing discipline on the link's output queue. In addition, it notifies the outside world and starts to drop frames as described below.

The router raises an alarm when the number of bytes queued to a frame-relay link exceed the absolute congestion threshold and clears the alarm when the number of bytes queued has remained below the absolute congestion threshold for 10 seconds.

If the router attempts to add a frame to the link output queue, and the addition of the frame would cause the link output queue to exceed the absolute congestion threshold the frame is dropped, regardless of where in the queue it would be added.

The described data link interface thus alleviates the problem occurring in the prior art where the routers continue to send data out over frame relay links even in the event of severe network congestion. Key applications keep running.

I claim:

1. A data link interface for sending and receiving data over a virtual connection on a common link in a packet-switched network, comprising means for detecting congestion in the network, means for enqueing packets for transmission over said virtual connection, means for adjusting the transmission rate in response to the detection of said congestion so as to reduce congestion in the network, means for sorting traffic by conversation between two endpoints and re-ordering packets from different conversations on said common link while maintaining the order of transmission for each conversation in order to achieve fair allocation of bandwidth among different conversations when the detected congestion exceeds a predetermined mild congestion threshold, and means for dropping packets when the detected congestion exceeds a predetermined severe congestion threshold.

2. A data link interface as claimed in claim 1, wherein said detecting means comprises means for detecting congestion notification bits in received data packets.

3. A data link interface as claimed in claim 1, wherein said adjusting means reduces the transmission rate to a predetermined committed information rate in the event of network congestion.

4. A data link interface as claimed in claim 1, wherein said network is a frame relay network.

5. A data link interface as claimed in claim 4, wherein said virtual connection is a permanent virtual connection.

6. A data link interface as claimed in claim 1, characterized in that it further comprises means for computing when a packet in each conversation would normally be transmitted on the basis of packet size assuming each conversation had a dedicated link, said sorting and re-ordering means arranging the order of transmission so that the packets with the earliest start of transmission time are sent first.

7. A router incorporating a frame relay data link interface as claimed in claim 1.

8. A method of reducing congestion over a virtual connection on a common link in a frame relay network, comprising the steps of detecting congestion in the network, adjusting the transmission rate in response to the detection of said congestion so as to reduce congestion in the network, sorting traffic by conversation between two endpoints and re-ordering packets from different conversations on said common link when the detected congestion exceeds a predetermined mild congestion threshold while maintaining the order of transmission for each conversation in order to achieve fair allocation of bandwidth among different conversations, and dropping packets when said detected congestion exceeds a predetermined severe congestion threshold.

9. A method as claimed in claim 8, wherein congestion notification bits are detected in received data packets.

10. A method as claimed in claim 8, wherein the transmission rate is reduced to a predetermined committed information rate in the event of network congestion.

11. A method as claimed in claim 8, characterized in that said virtual connection is a permanent virtual connection.

12. A method as claimed in claim 8, wherein the time when a packet in each conversation would be transmitted is computed on the basis of packet size assuming each conversation had a dedicated link, and the order of transmission is arranged so that the packets with the earliest start of transmission time are sent first.

* * * * *